(12) United States Patent
Lekutai et al.

(10) Patent No.: US 11,234,157 B2
(45) Date of Patent: Jan. 25, 2022

(54) NETWORK LATENCY AWARE MOBILE EDGE COMPUTING ROUTING

(71) Applicant: T-Mobile USA, Inc., Bellevue, WA (US)

(72) Inventors: Gaviphat Lekutai, Kirkland, WA (US); Taha Najeeb, Bellevue, WA (US); Shuqing Xing, Bellevue, WA (US); Brian Allan Olsen, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 45 days.

(21) Appl. No.: 16/378,414

(22) Filed: Apr. 8, 2019

(65) Prior Publication Data
US 2020/0322836 A1 Oct. 8, 2020

(51) Int. Cl.
| | |
|---|---|
| *H04L 12/26* | (2006.01) |
| *H04W 24/08* | (2009.01) |
| *H04W 24/10* | (2009.01) |
| *H04W 28/02* | (2009.01) |
| *H04W 40/12* | (2009.01) |
| *H04W 40/20* | (2009.01) |
| *H04W 60/00* | (2009.01) |

(52) U.S. Cl.
CPC ......... *H04W 28/0284* (2013.01); *H04L 43/12* (2013.01); *H04W 24/08* (2013.01); *H04W 24/10* (2013.01); *H04W 28/0236* (2013.01); *H04W 40/12* (2013.01); *H04W 40/20* (2013.01); *H04W 60/00* (2013.01)

(58) Field of Classification Search
CPC ...... H04L 43/12; H04W 24/08; H04W 24/10; H04W 28/0236; H04W 28/0284; H04W 40/12; H04W 40/20; H04W 60/00
See application file for complete search history.

(56) References Cited

U.S. PATENT DOCUMENTS

| | | | | |
|---|---|---|---|---|
| 5,933,155 A | * | 8/1999 | Akeley | G09G 5/399 345/536 |
| 7,924,711 B2 | * | 4/2011 | Rosen | G10L 21/04 370/230 |
| 8,381,216 B2 | * | 2/2013 | Gowda | G06F 9/46 718/102 |

(Continued)

*Primary Examiner* — Alpus Hsu
(74) *Attorney, Agent, or Firm* — Lee & Hayes, P.C.

(57) ABSTRACT

A location for application processing is selected based on latency measurements associated with a mobile network. Instead of performing application processing at a predetermined location within a network, the application processing for an application is located within the network based on latencies measured within the network as well as other considerations. For instance, the determination of the location within the network can be based on latency measurements, target latency specifications of an application, the availability of computing resources at a location, and the like. A latency aware routing controller selects one or more locations to perform application processing. The locations may include computing resources located at or near the wireless base station (BS), between the base station and other locations within the network, at the core network, at the Internet, and/or at other locations to provide applications with the computing resources to perform the application processing.

20 Claims, 6 Drawing Sheets

(56) References Cited

U.S. PATENT DOCUMENTS

| | | | | |
|---|---|---|---|---|
| 8,566,441 B2* | 10/2013 | Agarwal | .................. | H04L 43/04 |
| | | | | 709/224 |
| 9,015,289 B2* | 4/2015 | Tseitlin | .................. | H04L 69/329 |
| | | | | 709/220 |
| 9,270,549 B2* | 2/2016 | Eidelman | ................ | H04L 43/16 |
| 9,292,620 B1* | 3/2016 | Hoover | ................ | G06F 16/2471 |
| 9,329,047 B2* | 5/2016 | Jackson | ................ | G01C 21/34 |
| 9,485,108 B2* | 11/2016 | Pazos | .................... | H04L 67/325 |
| 9,584,382 B2* | 2/2017 | Tofighbakhsh | ......... | H04L 67/18 |
| 9,602,377 B2* | 3/2017 | Agarwal | ............. | H04L 43/0864 |
| 9,722,930 B2* | 8/2017 | Cucinotta | ............ | H04L 47/2425 |
| 9,788,146 B2* | 10/2017 | Kosseifi | ................ | H04W 4/021 |
| 9,794,744 B1* | 10/2017 | Gu | ........................ | H04W 12/06 |
| 9,900,225 B2* | 2/2018 | Tofighbakhsh | ......... | H04L 65/80 |
| 9,930,133 B2* | 3/2018 | Susarla | ................ | H04L 67/2842 |
| 10,069,741 B2* | 9/2018 | Mendez | .............. | H04L 43/0852 |
| 10,158,528 B2* | 12/2018 | Cobb | .................. | H04L 41/0816 |
| 10,659,190 B1* | 5/2020 | Liu | ........................ | H04L 1/0018 |
| 10,708,331 B1* | 7/2020 | Joliveau | ................ | H04L 65/608 |
| 2015/0134795 A1* | 5/2015 | Theimer | ............... | G06F 16/254 |
| | | | | 709/223 |
| 2017/0251058 A1* | 8/2017 | Zachariassen | .......... | G06F 3/061 |
| 2019/0132767 A1* | 5/2019 | Shi | ........................ | H04W 24/08 |
| 2020/0145310 A1* | 5/2020 | Lodhia | .................. | H04L 41/147 |
| 2020/0169479 A1* | 5/2020 | Ireland | .................. | H04L 41/142 |

* cited by examiner

NETWORK LATENCY AWARE MOBILE EDGE COMPUTING ROUTING

BACKGROUND

Mobile networks are expanding rapidly. For example, not only are 4G-LTE networks expanding, wireless service providers are deploying 5G networks. As these networks expand, more and more applications are relying on the performance and low latency characteristics of these networks. Some of these applications, however, may not operate properly if the latency of the network exceeds some specified value. For example, applications associated with autonomous driving, augmented reality, virtual reality, and the like may rely on very low latencies (e.g., less than 100 ms), whereas other applications, such as applications relating to monitoring networks, may perform satisfactorily with higher latencies (e.g., >1000 ms). Performing processing within the specified latency associated with these types of applications can be challenging. Adding to this challenge is the fact that wireless networks can become more congested at various points thereby increasing the latency of the network.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
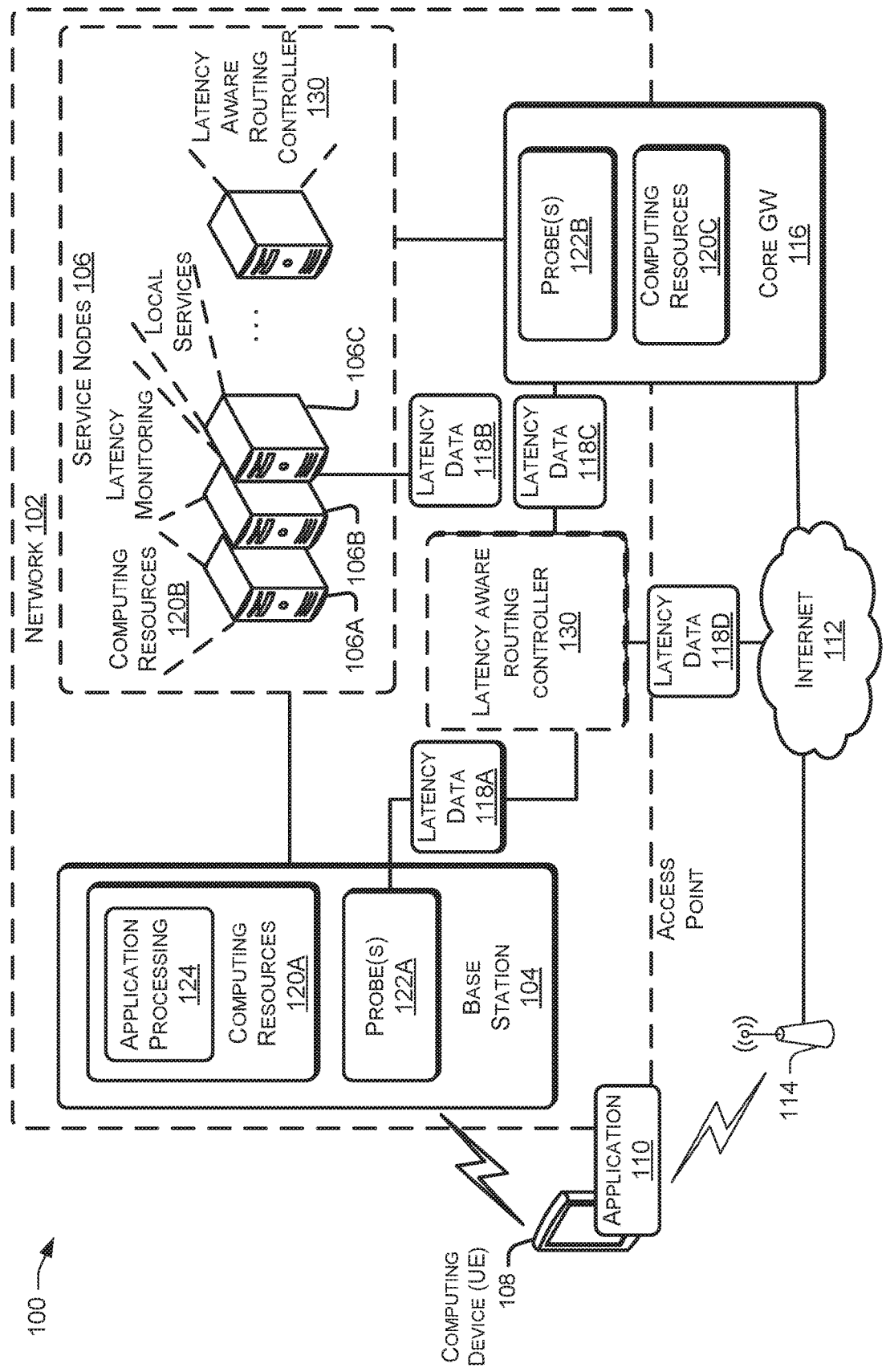
FIG. 1 is a block diagram showing an illustrative environment for network latency aware mobile edge computing routing.

Described herein are techniques and systems for network latency aware mobile edge computing (MEC) routing. Using techniques described herein, processing associated with an application (which may be referred to herein as "application processing") can be performed at one or more dynamically determined locations associated with a mobile network. The determination of the location within the network can be based on latency measurements within the network, latency specifications of the application (which may be referred to herein as a "target latency"), related latency (e.g., jitter, packet loss, packet delivery rate, . . . ), the availability of computing resources at a particular location, and the like.

Generally, latency refers to the time it takes a packet of data to move from one point within the network to another point within the network.

As more and more applications that have low target latencies (e.g., automatic maneuvering for vehicles) are utilized on mobile networks (e.g. 5G networks), the need to perform application processing "closer" to the UE and near the "edge" of the network increases. Instead of performing application processing at a predetermined location within a network, the application processing for an application can be located within the network based on latencies measured within the network. For instance, applications having low target latencies can be moved closer to the edge of the network (e.g., closer to the user equipment (UE)) whereas application processing for an application having higher target latencies can be moved away from the edge of the network (e.g., the core of the network, the Internet, . . . ).

In some configurations, techniques described herein utilize computing resources, such as server computing devices, deployed at different locations within the mobile network to perform application processing. For instance, server computing devices may be placed at or near the wireless base station (BS), between the base station and other locations within the network, at the core network, at the Internet, or at other locations to provide applications with the computing resources that meet the target latencies of the application.

While computing resources located near or at the base station may provide the lowest latency for application processing, not all applications utilized have the same low target latency specifications. As a result, computing resources can be positioned throughout the network "path" with the applications specifying the lowest target latency specifications to be executed nearer the base station, the applications having the largest target latency specifications farthest away from the edge (e.g., the core network, the Internet), and the applications with target latency specifications between the lowest and largest somewhere between the BS and the farthest location away from the edge. For instance, the application processing can be performed using computing resources positioned along the "backhaul" portion of the network that comprises the links between BS and CORE GW. In some configurations there is a node that is located between the BS and the CORE GW, called RAN GW. Thus, the "backhaul" portion comprises the links between RAN GW and CORE GW; and the "midhaul" portion comprises the links between BS and RAN GW. When latency associated with application processing for an application becomes too high at a location (e.g., at the core network), the application processing for the application can be moved to computing resources located closer to the UE.

To assist in determining where to perform application processing, latency measurements are obtained at different points (i.e., locations) within the network (e.g., one or more locations within the base station, the core network, and the like). In some examples, network probes and/or monitoring systems are placed at various locations within the network to determine network latencies between different measurement points within the network. The latency measurements can be obtained from commercially available network tools and/or from other software/hardware. According to some configurations, the network probes and/or monitoring systems are configured to monitor the network latencies (e.g. continuously and/or at predetermined times).

In some configurations, this live latency information associated with different links in the network can be used to determine the traffic status of the network and/or predict future traffic within the network. This latency information can then be used (e.g., by a latency aware routing controller) to determine the location of where to perform the application processing. In some examples, a latency aware routing controller can perform a live traffic routing calculation to direct network traffic to computing resources located within the network. For example, the latency aware routing controller can locate and/or change the location of application processing between different locations within the network. More details are provided below with regard to FIGS. 1-6.

FIG. 1 is a block diagram showing an illustrative environment 100 for network latency aware mobile edge computing routing. The environment 100 may include a network 102 that is operated by a wireless service provider and one or more other networks coupled to network 102, such as the Internet 112. The environment 100 is illustrated in simplified form and may include many more components.

Generally, mobile edge computing (MEC) refers to performing application processing associated with an application using computing resources that are located closer to the UE (e.g., nearer the "edge" of the network) to increase the performance of the application. As briefly discussed above, using techniques described herein, a latency aware routing controller 130 locates application processing for an application 110 using latency measurements within the network and a target latency specification associated with the application 110.

The network 102 may include one or more base stations 104 and one or more service nodes 106. A base station 104 may handle traffic and signals between electronic devices, such as the computing device 108 and other computing devices (not shown), and a core network of the network 102. For example, the base station 104 may perform the transcoding of speech channels, allocation of radio channels to electronic devices, paging, transmission and reception of voice and data, as well as other functions.

The base station 104 may include several base transceiver stations (BTS). A BTS may include a transceiver, antenna, and additional network switch and control equipment that provide a network cell for facilitating wireless communication between computing devices and the core network of the network 102. In some instances, the base station 104 may include an eNodeB and/or a gNodeB. As illustrated, the base station 104 includes computing resources 120A (e.g., server computing devices) for performing application processing 124 for one or more applications.

The base station 104 can also include probe(s) 122A that are configured to measure latencies associated with the base station 104. For example, the probe(s) 122A may determine processing times associated with modules in the base station 104, the upload and download times to the computing device 108, the latency between the base station 104 and the service nodes 106 located within the core network, and the like. The latencies can be associated with different types of connections, including wired and/or wireless connections. More details relating to determining latencies associated with the network 102 are provided below with reference to FIGS. 2-6.

The computing device 108 may be an electronic device such as a smart phone, a personal digital assistant, a netbook, a laptop computer, and/or another electronic device that is capable of sending and/or receiving voice or data via the network 102 and/or a Wi-Fi network. For example, the computing device 108 can be integrated into a vehicle, a drone, a plane, a bicycle, a mobile device, and the like. In some instances, the computing device 108 can be configured to send and receive data using any wired or wireless protocols.

The CORE GW network 116 may be responsible for routing voice communication to other networks, as well as routing data communication to external packet switched networks, such as the Internet 112. For example, the one or more service nodes 106 may be a Gateway GPRS Support Node (GGSN) or another equivalent node. According to some configurations, the one or more CORE GWs also include a Policy and Charging Rules Function (PCRF) node (not shown) that is utilized to enforce policy rules of the network. The PCRF node can be configured to automatically make policy decisions for each subscriber (e.g., each user equipment (UE)) active on the network. For example, the PCRF may be utilized to allocate bandwidth of the network as well as provide different levels of service to different computing devices on the network. In some configurations, the PCRF node can be used to assist in determining the location of where to perform application processing for one or more applications, such as application 110. Additionally, some data can be prioritized within the network.

According to some configurations, the RAN GW network includes a latency monitoring node 106B, a local services node 106C, and a latency aware routing controller 130. The latency monitoring node 106B is configured to measure and/or obtain latency measurements associated with different locations within the network (e.g., from one or more locations within the base station 104, latency measurements associated with the core network, and the like). In some examples, the latency monitoring node 106B obtains latency data 118 from network probe(s) 122, and/or other monitoring systems located at different locations within the network 102. The latency measurements can be obtained from commercially available network tools and/or from other software/hardware. According to some configurations, the network probes and/or monitoring systems are configured to continuously monitor the network latencies throughout different locations within the network.

The latency aware routing controller 130 node is configured to utilize latency data 118, such as latency data 118A, 118B, and 118C, to locate application processing for an application, such as application 110, within the network. For example, the latency aware routing controller 130 node can position application processing 124 for an application to utilize computing resources 120A within the base station 104, computing resources 120B within the core network (e.g., utilizing one or more service nodes 106 such as service node 106A, at computing resources 120C located within the gateway 116, within the Internet 112, and/or at other locations within the network 102, such as at local services associated with node 106C. In some examples, a latency aware routing controller 130 is configured to perform live traffic routing calculations to assist in determining where to position the application processing 124 for application 110. The latency aware routing controller 130 can locate and/or change the location of application processing between different locations within the network.

In some configurations, one or more of the RAN GW service nodes 106 may be configured as one or more application servers that provide support for one more applications, such as application 110. Application 110 may be any type of application. Some example applications include, but are not limited to autonomous vehicle applications, automotive applications, Internet of Things (IoT) applications, monitoring applications, browser applications, messaging applications, voice applications (e.g., Voice over Internet Protocol "VoIP" applications), video applications, and the like. While the RAN GW service nodes 106 are illustrated within the network 102, one or more other computing devices may be located outside of the network 102. For example, an application server, or some other server or device, may be connected to the network 102 via one or more external packet switched networks, such as the Internet 112.

According to some configurations, a client application, such as application 110, on the computing device 108 may establish data communication with the network 102 through a data connection to the base station 104. The base station 104 may route a communication from the communication device 108 through the core network via the RAN GW service nodes 106. In such instances, the service nodes 106 may be capable of performing subscriber profile insertion with respect to data traffic between the application 110 on the computing device 108 and the application server.

When a communication request arrives at the network 102, one or more of the RAN GW service nodes 106 may determine the identity of the originating computing device for the communication (e.g., using a telephone number, IMEI, ImsI, IP address) as well as the identity of the computing devices to send the communication. According to some configurations, the application 110 on the computing device 108 may connect to the RAN GW service nodes 106, or some other component such as an application server, via the Internet 112. In such instances, the application 110 may connect to the Internet 112 via Wi-Fi access point 114. Accordingly, data traffic from the application 110 may be routed to the service nodes 106 by the gateway 116 of the network 102.

As briefly discussed above, application processing associated with an application, such as application 110, can be performed at different locations within the network where computing resources, such as computing resources 120A-120D are located. In some configurations, an application 110 is associated with a target latency that is used to identify an upper limit for latency associated with processing for the application. An application 110 may specify the target latency and/or a target latency can be associated with the application 110 based on a type of the application, or some other information indicating the target latency. For example, application 110 can specify the target latency (e.g., 10 ms, 50 ms, 100 ms, 1000 ms, . . . ) or the latency aware routing controller 130 can determine a type of the application and associate the target latency based on the type of application. Generally, applications 110 that utilize real-time data are associated with lower target latencies, whereas applications 110 that do not utilize real-time data are associated with higher target latencies.

According to some configurations, the location of the computing resources 120 used for application processing 124 for an application 110 can be determined by a software component and/or a hardware component that operates within network 102, such as within the core network (e.g., latency aware routing controller 130), or a latency aware routing controller 130 that is located at some other location within the network 102. For example, the latency aware routing controller 130 indicated by a dashed line within FIG. 1 is one such location.

In some examples, the latency aware routing controller 130 can access target latencies associated with application 110. For example, the PCRF node in CORE GW 116 may identify that an application 110 utilized by computing device 108 is a type of application that has a target latency of under 100 ms, and as such, cause the application processing for the application 110 to be performed at a location within the network that satisfies the target latency based on the current latency data 118 obtained from different locations within the network 102. More details are provided below.

Figure 2:
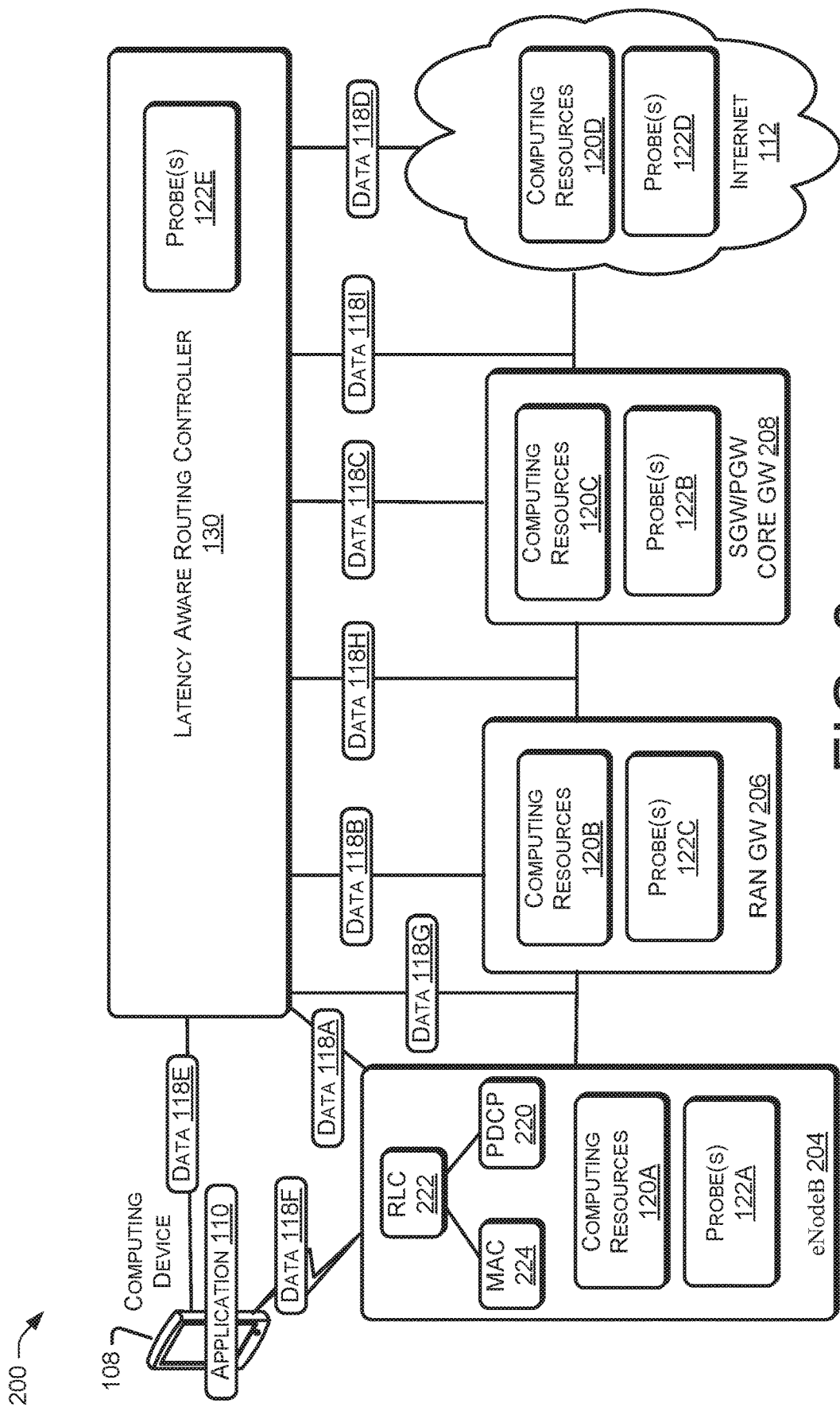
FIG. 2 is a block diagram illustrating a system that includes a latency aware routing controller that monitors latencies at different locations within the network.

FIG. 2 is a block diagram showing an illustrative environment 200 that includes a latency aware routing controller 130 that monitors latencies at different locations within the network 102. The environment 200 may include a network 102 that is operated by a wireless service provider. The environment 200 is illustrated in simplified form and may include many more components.

In the example illustrated in FIG. 2, the environment 200 includes one or more evolved nodes (eNodeB) 204 that communicates with a computing device, such as computing device 108, in one or more cells. Generally, the eNodeB 204 sends and receives radio transmissions to the computing devices using the analogue and digital signal processing functions of an air interface (e.g., associated with 4G LTE and 5G networks). The eNodeB 204 generally handles radio communications with the computing device 108, as well as other computing devices. The eNodeB 204 also handles radio resource management and handover decisions. For example, the eNodeB 204 is configured to perform various operations, such as but not limited to operations associated with Packet Data Convergence Protocol (PDCP) 220, Radio Link Control (RLC) 222, and Medium Access Control 224 (MAC) sublayers that are terminated in the eNodeB 204.

As briefly discussed above, some applications have low target latency specifications and some applications have a more flexible target latency specification. Even though application processing for an application 110 may initially be performed utilizing computing resources 120 deployed at one location within the network 102, the application processing 124 can be moved to another location based on the current latencies associated with and/or predicted for the network 102. For example, during busy hours or special occasions (sporting event, concert, fair, . . . ), the network 102 can become congested such that application processing for applications having more lenient target latencies (such as connected vehicles) may be moved closer to the UE 108 (e.g. closer to the vehicle) during these times of congestion. In some examples, the application can be performed using computing resources 122D associated with the Internet 112.

As illustrated, the latency aware controller 130 obtains latency data 118, such as latency data 118A-118G (which may be referred to as "latency data 118"), from different locations within the network 102. The latency data 118 can be determined using network probes, such as probe(s) 122A-122E (which may be referred to herein as "network probes 122"), monitoring systems, and or other hardware/software components. For example, probe(s) 122A can determine latencies associated with the eNodeB 204.

The latencies can include latencies associated with the PDCP 220, the RLC 222, the MAC 224, as well as other layers. The probe(s) 122 can be commercially available probes/monitoring system, internal equipment (BS, PGW/SGW, etc.) Key Performance Indicator (KPI) values, and/or custom hardware/software components. As a particular example, probe(s) 122A may determine at a particular point in time that the latency at the RLC 222 layer is 37 ms, 1.5 ms at the MAC 224 layer, and 8.5 ms at the PDCP 220 layer. The probe(s) 122A can also be configured to determine the latency between the UE 108 to the eNodeB 204, as well as determine other latencies (not shown).

Generally, the determination of the latency within the network can be performed utilizing more network probes within the network 102. In some configurations, more or less network latency measurements can be determined and utilized. The latency aware routing controller 130 can receive this latency data directly from probe(s) 122A, or other latency monitoring systems, and/or obtained some other way (e.g., access the latency data 118 within a memory).

Latency aware routing controller 130 receives the latency data 118 and determines one or more locations within the network that are capable of performing the application processing 124 for the application 110 based on the target latency associated with the application 110. As an example, assume that application 110 has a target latency of 100 ms or less and that the latency data 118 includes latency measurements from computing device 108 UE to eNodeB 204 (94 ms) to RAN GW service node core 206 (7.8 ms) to SGW/PGW CORE GW 208 (8.5 ms) to the Internet 112 (16 ms). To satisfy the target latency of 100 ms, the latency aware routing controller 130 selects computing resources 120A to provide the application processing for application 110. For an application that has a higher target latency, such as 250 ms, the latency aware routing controller 130 can select any one or more of computing resources 120A-120D.

The latency measurements for the network 102 can change throughout the day. For example, as the use of the network 102 increases/decreases, the latency measurements will fluctuate. As such, some applications having application processing performed at one location (e.g., at SGW/PGW CORE GW 208 utilizing computing resources 120C) may no longer be reliable to meet the desired target latency of the application. In some configurations, the latency aware routing controller 130 monitors (e.g., in real-time) the latency data 118 within the network and determines the location of where to perform application processing for the applications within the network.

Figure 3:
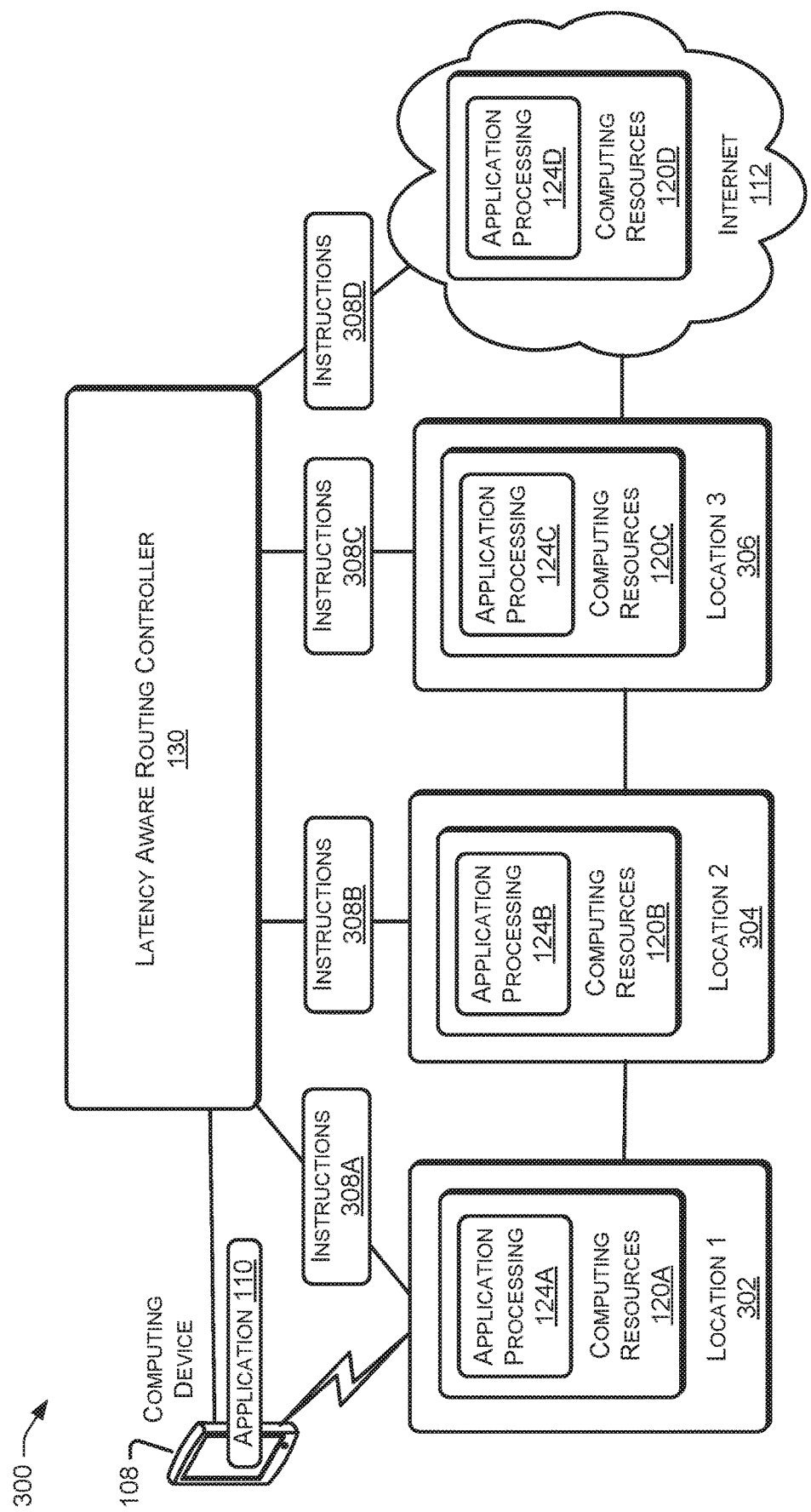
FIG. 3 is a block diagram illustrating a system that includes a latency aware routing controller that causes processing associated with an application to be performed at a dynamically determined location within the network.

FIG. 3 is a block diagram illustrating a system that includes a latency aware routing controller 130 that causes processing associated with an application 110 to be performed at a dynamically determined location within the network. The environment 300 is illustrated in simplified form and may include many more components.

Environment 300 shows computing resources 120 available for application processing 124 at different locations within a network and the Internet 112. As illustrated, environment 300 includes computing resources 120A for application processing 124A at location 1 (302), computing resources 120B for application processing 124B at location 2 (304), computing resources 120C for application processing 124C at location 3 (306), and computing resources 120D for application processing 124D at Internet 112. For purposes of explanation, location 1 is closest to the computing device 108 (i.e. closest to the "edge" of the network), location 2 is second closest to the computing device 108, location 3 is third closest to the computing device 108, and location 4 is furthest from the computing device 108. Generally, the latency increases as the location is farther from the edge of the network. While four locations are shown, more or fewer locations may be utilized to perform application processing for an application.

As discussed above, latency aware routing controller 130 is configured to dynamically determine the location of the computing resources 120 to utilize for application processing 124 for an application, such as application 110. The determination is based on the latency measurements (i.e. latency data 118) obtained from probe(s) 122 and/or monitoring systems. In response to determining a location that meets the target latency of the application 110 (or the location that is closest to the target latency), the latency aware routing controller 130 provides instructions 308 to at least one of the locations to instruct the location to perform application processing 124 for the application 110.

Latency aware routing controller 130 provides instructions 308A to cause application processing 124A to be performed by computing resources 120A at location 1 (302). When location 2 (304) is determined to be utilized, the latency aware routing controller 130 provides instructions 308B to cause application processing 124B to be performed by computing resources 120B. When location 3 (306) is determined to be utilized, the latency aware routing controller 130 provides instructions 308C to cause application processing 124C to be performed by computing resources 120C. When the Internet 112 is determined to be utilized, the latency aware routing controller 130 provides instructions 308D to cause application processing 124D to be performed by computing resources 120D.

As briefly discussed above, application processing associated with an application, such as application 110, can be performed at different locations within the network where computing resources, such as computing resources 120A-120D are located. In some configurations, the latency aware routing controller 130 and/or some other component determines a target latency associated with the application 110. The target latency identifies an upper limit for latency associated with application processing for the application 110. In some configurations, the application 110 specifies the target latency. In other examples, the latency aware routing controller 130 determines the type of application. For example, application 110 can specify the target latency (e.g., 10 ms, 50 ms, 100 ms, 1000 ms, . . . ) or the latency aware routing controller 130 can determine a type of the application and associate the target latency based on the type of application. Generally, applications 110 that utilize real-time data are associated with lower target latencies, whereas applications 110 that do not utilize real-time data are associated with higher target latencies.

As an example, assume that the latency associated with location 1 (302) is 100 ms, the latency associated with location 2 (304) is 130 ms, the latency associated with location 3 (302) is 300 ms, and the latency associated with Internet (112) is 400 ms. In this example, if the target latency of application 110 is 80 ms, then the latency controller 130 selects and provides instructions 308A to location 1 (302) that instructs computing resources 120A to perform application processing 124A for application 110. If the target latency of application 110 is 150 ms, then the latency controller 130 selects and provides instructions 308B to location 2 (304) that instructs computing resources 120B to perform application processing 124B for application 110. In some examples, the latency aware routing controller 130 can select more than one location. For instance, the latency aware routing controller 130 can select location 1 (302) and location 2 (304) to perform application processing for application 110. In other configurations, the latency aware routing controller 130 can select either one of the locations that satisfy the target latency for the application 110.

Similarly, if the target latency of application 110 is below 300 ms, then the latency controller 130 can select location 1 (302), and/or location 2 (304), and/or location 3 (306) that includes computing resources 120C. In some configurations, the latency aware routing controller 130 selects and provides instructions 308C to location 3 (306) that instructs computing resources 120C to perform application processing 124C for application 110. If the target latency of application 110 is larger than 400 ms, then the latency controller 130 can select any of the locations. According to some configurations, the latency aware controller 130 selects and provides instructions 308D to the Internet 112 that instructs computing resources 120D to perform application processing 124D for application 110.

After selecting one or more locations to perform application processing, the latency aware routing controller 130 can change the selected location for application processing for an application. For example, the latency aware routing controller 130 can change the location of application processing for an application, such as application 110, based on current latency data 118 and/or projected latencies associated with the network.

Figure 4:
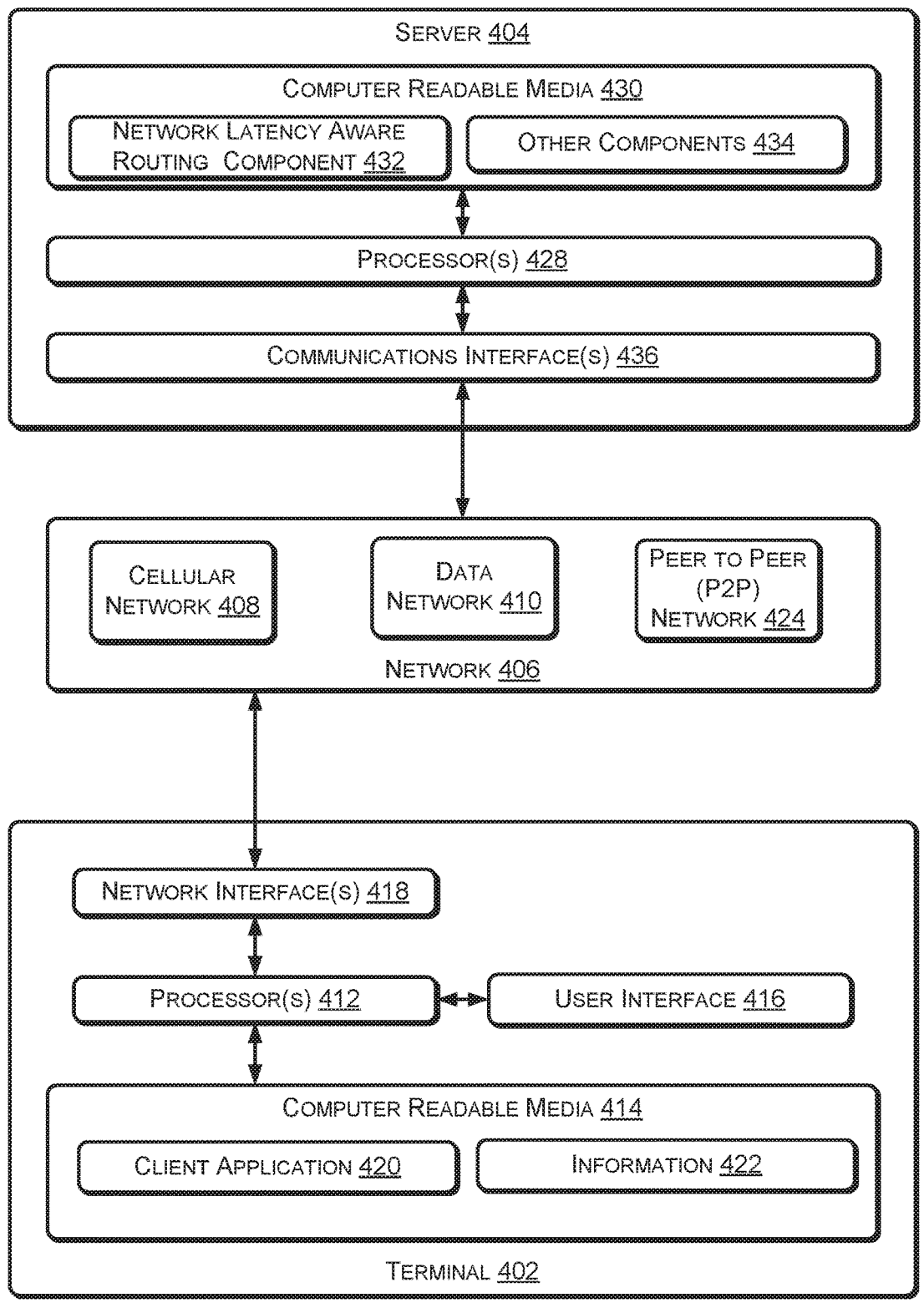
FIG. 4 is a block diagram illustrating a system that includes a network aware latency routing module.

FIG. 4 is a block diagram illustrating a system 400 that includes a network latency aware routing component 432 for selecting and causing application processing to be performed at a location within a network according to some implementations. The system 400 includes a terminal 402, which can represent computing device 108 of FIG. 1, coupled to a server 404, via a network 406. The server 404 can represent one or more of the service nodes 106. The network 406 can represent, e.g., networks 102 or 112, or other networks.

The network 406 can include one or more networks, such as a cellular network 408, a data network 410, and a peer to peer (PTP) network 424. The network 406 can include one or more core network(s) connected to terminal(s) via one or more access network(s). Example access networks include LTE, WIFI, GSM Enhanced Data Rates for GSM Evolution (EDGE) Radio Access Network (GERAN), UTRAN, and other cellular access networks. Message transmission, reception, fallback, and deduplication as described herein can be performed, e.g., via 3G, 4G, 5G, WIFI, or other networks.

The cellular network 408 can provide wide-area wireless coverage using a technology such as GSM, Code Division Multiple Access (CDMA), UMTS, LTE, or the like. Example networks include Time Division Multiple Access (TDMA), Evolution-Data Optimized (EVDO), Advanced LTE (LTE+), 5G New Radio (NR), Device-To-Device (D2D), Vehicle-To-Everything (V2X) direct communication, Generic Access Network (GAN), Unlicensed Mobile Access (UMA), Orthogonal Frequency Division Multiple Access (OFDM), GPRS, EDGE, Advanced Mobile Phone System (AMPS), High Speed Packet Access (HSPA), evolved HSPA (HSPA+), VoIP, VoLTE, IEEE 802.1x protocols, wireless microwave access (WIMAX), WIFI, and/or any future IP-based network technology or evolution of an existing IP-based network technology. Communications between the server 404 and terminals such as the terminal 402 can additionally or alternatively be performed using other technologies, such as wired (Plain Old Telephone Service, POTS, or PSTN lines), optical (e.g., Synchronous Optical NETwork, SONET) technologies, and the like.

The data network 410 can include various types of networks for transmitting and receiving data (e.g., data packets), including networks using technologies such as WIFI, IEEE 802.15.1 ("BLUETOOTH"), Asynchronous Transfer Mode (ATM), WIMAX, and other network technologies, e.g., configured to transport IP packets. In some examples, the server 404 includes or is communicatively connected with an IWF or other device bridging networks, e.g., LTE, 3G, and POTS networks. In some examples, the server 404 can bridge SS7 traffic from the PSTN into the network 406, e.g., permitting PSTN customers to place calls to cellular customers and vice versa.

In some examples, the cellular network 408, the data network 410, and the P2P network 424 can carry voice or data. For example, the data network 410 can carry voice traffic using VoIP or other technologies as well as data traffic, or the cellular network 408 can carry data packets using HSPA, LTE, or other technologies as well as voice traffic. The P2P network 424 can carry signaling/data traffic from neighboring devices/network in a mesh-like communication such as Skype, or a direct communication such as D2D, vehicle-to-everything (V2X) messages, and the like. Some cellular networks 408 carry both data and voice in a packet-switch (PS) format. For example, many LTE networks carry voice traffic in data packets according to the VoLTE standard. Various examples herein provide origination and termination of, e.g., carrier-grade voice calls on, e.g., networks 406 using circuit-switching (CS) transports or mixed VoLTE/3G transports, or on terminals 402 including OEM handsets and non-OEM handsets.

The terminal 402 can be or include a wireless phone, a wired phone, a tablet computer, a laptop computer, a wristwatch, or other type of terminal. The terminal 402 can include one or more processors 412, e.g., one or more processor devices such as microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs), and one or more computer readable media (CRM) 414, such as memory (e.g., random access memory (RAM), solid state drives (SSDs), or the like), disk drives (e.g., platter-based hard drives), another type of computer-readable media, or any combination thereof. The CRM or other memory of terminal 402 can hold a datastore, e.g., an SQL or NoSQL database, a graph database, a BLOB, or another collection of data. The terminal 402 can further include a user interface (UI) 416, e.g., including an electronic display device, a speaker, a vibration unit, a touchscreen, or other devices for presenting information to a user and receiving commands from the user. The terminal 402 can further include one or more network interface(s) 418 configured to selectively communicate (wired or wirelessly) via the network 406, e.g., via an access network 112 or 408, 410.

The CRM 414 can be used to store data and to store instructions that are executable by the processors 412 to perform various functions as described herein. The CRM 414 can store various types of instructions and data, such as an operating system, device drivers, etc. The processor-executable instructions can be executed by the processors 412 to perform the various functions described herein.

The CRM 414 can be or include computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, non-transitory medium which can be used to store the desired information and which can be accessed by the processors 412. Tangible computer-readable media can include volatile and nonvolatile, removable and non-removable media implemented in any method or technology for storage of information, such as computer readable instructions, data structures, program components, or other data.

The CRM 414 can include processor-executable instructions of a client application 420. The client application 420, e.g., a native or other dialer, can permit a user to originate and terminate communication sessions associated with the terminal 402, e.g., a wireless phone. The client application 420 can additionally or alternatively include an Sms, RCS, or presence client, or a client of another telephony service offered by the server 404. The client application 420 can also be any other type of application, such as application 110 described herein.

The CRM 414 can store information 422 identifying the terminal 402. The information 422 can include, e.g., an IMEI, an ImsI identifying the subscriber using terminal 402, or other information discussed above. The CRM 414 can additionally or alternatively store credentials (omitted for brevity) used for access, e.g., to Ims or RCS services.

The server 404 can include one or more processors 428 and one or more CRM 430. The CRM 430 can be used to store processor-executable instructions of a network latency aware routing component 432, as well as one or more other components 434. In some configurations, the server 404 can be configured as a network latency aware routing controller node 130, a latency monitoring node 106B, and the like. The processor-executable instructions can be executed by the one or more processors 428 to perform various functions described herein, e.g., with reference to FIGS. 1-3, and 5-6.

In some examples, server 404 can communicate with (e.g., is communicatively connectable with) terminal 402 or other devices via one or more communications interface(s) 436, e.g., network transceivers for wired or wireless networks, or memory interfaces. Example communications interface(s) 436 can include ETHERNET or FIBER CHANNEL transceivers, WIFI radios, or DDR memory-bus controllers (e.g., for DMA transfers to a network card installed in a physical server 404).

In some examples, processor 412 and, if required, CRM 414, are referred to for brevity herein as a "control unit." For example, a control unit can include a CPU or DSP and instructions executable by that CPU or DSP to cause that CPU or DSP to perform functions described herein. Additionally, or alternatively, a control unit can include an ASIC, FPGA, or other logic device(s) wired (physically or via blown fuses or logic-cell configuration data) to perform functions described herein. Other examples of control units can include processor 428 and, if required, CRM 430.

Figure 5:
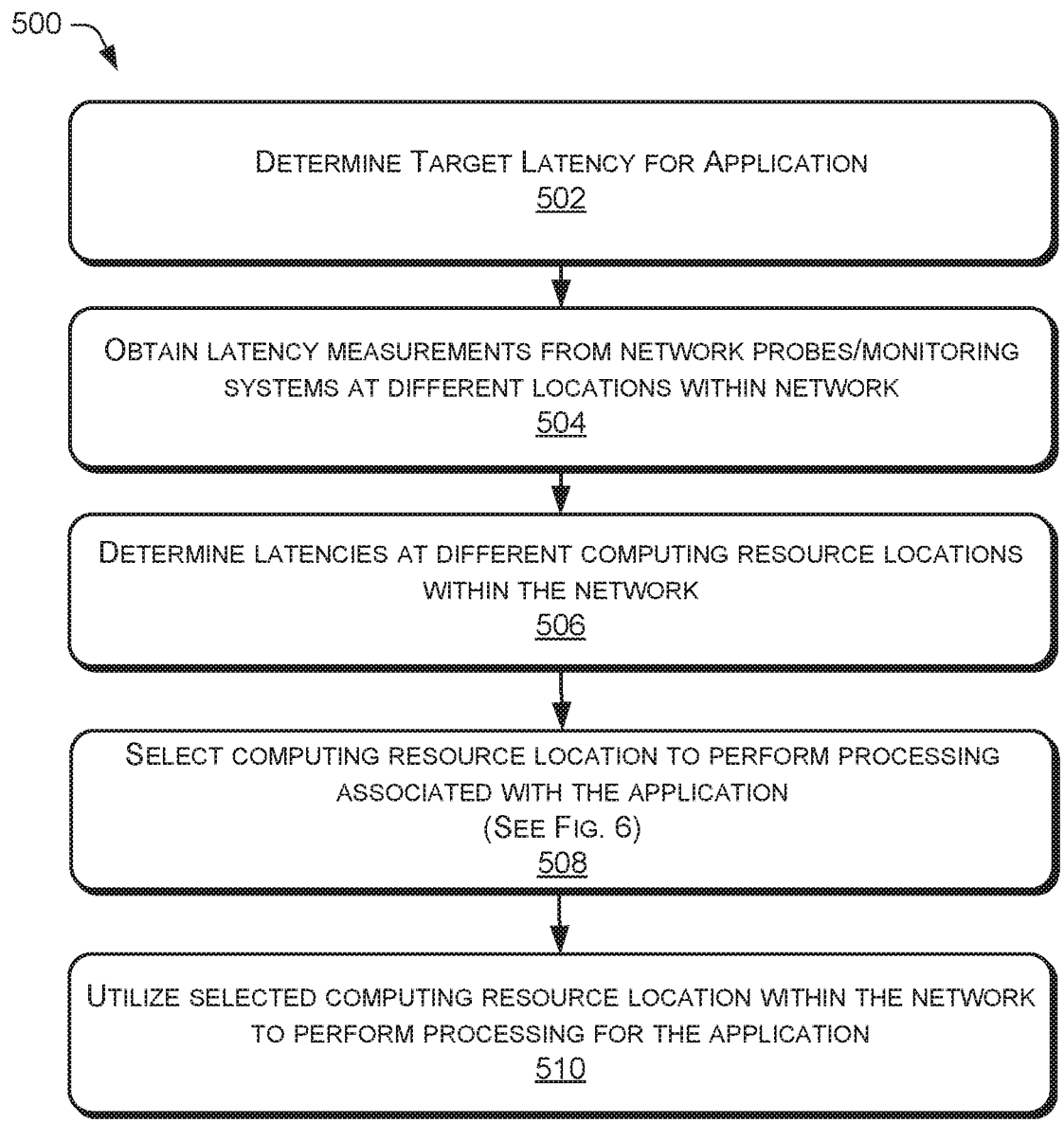
FIG. 5 is a flow diagram of an example process that includes determining a location in a mobile network where to perform processing for an application based on latency data according to some implementations.
Figure 6:
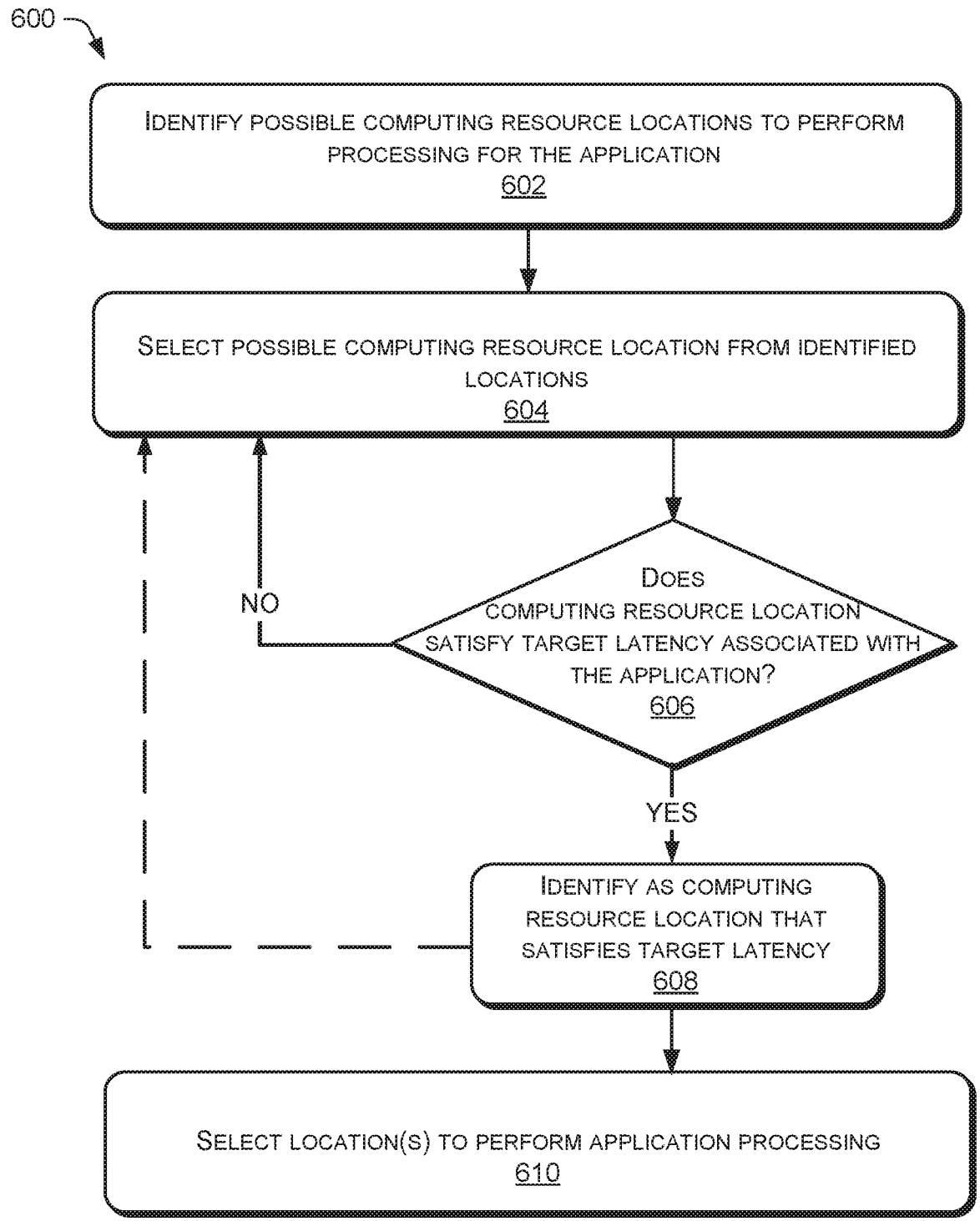
FIG. 6 is a flow diagram of an example process that includes identifying a location in a network to perform processing for an application according to some implementations.

In the flow diagrams of FIGS. 5 and 6, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 500 and 600 are described with reference to the systems 100, 200, 300, and 400 as described above, although other models, frameworks, systems and environments may implement these processes.

FIG. 5 is a flow diagram of an example process 500 that includes determining a location in a mobile network where to perform processing for an application based on latency data according to some implementations. The process 500 may be performed by one or more computing devices, such as the computing devices described with regard to FIGS. 1-4.

At 502, a target latency for an application 110 is determined. As discussed above, the application 110 may be any type of application. For example, application 110 can be associated with autonomous driving, augmented reality, virtual reality, monitoring networks, video streaming, voice calls, or any other type of application. Some applications 110 specify a low target latency, whereas other applications 110 specify a higher target latency. Generally, applications 110 that utilize real-time data are associated with lower target latencies, whereas applications 110 that do not utilize real-time data are associated with higher target latencies. According to some configurations, application 110 defines the target latency. In other configurations, the latency aware routing controller 130 identifies the target latency based on a type of the application 110. In some configurations, the latency aware routing controller 130 accesses a table, or some other data, that indicates a target latency with the type of application 110.

At 504, latency measurements are obtained. As discussed above, latency measurements are obtained from different locations within the network 102. In some examples, network probes 122 and/or monitoring systems are placed at various locations within the network (e.g., base station, core network, gateway, . . . ) to determine network latencies between different points within the network 102. The latency measurements can be obtained from commercially available network tools and/or from other software/hardware. According to some configurations, the network probes 122 and/or monitoring systems are configured to monitor the network latencies (e.g. continuously and/or at predetermined times and provide latency data 118 to latency aware routing controller 130.

At 506, latencies are determined for different computing resource locations within the network 102. As discussed above, the latency aware routing controller 130, or some other component, can calculate the latencies associated with different locations within the network using the latency data 118 obtained from the network probe(s) 122 and/or monitoring systems.

At 508, one or more computing resource locations to perform processing associated with the application are selected. As discussed above, the latency aware routing controller 130 receives the latency data 118 and determines one or more locations within the network for performing the application processing 124 for the application 110 based on the target latency associated with the application 110. Generally, the latency aware routing controller 130 selects the location for application processing that meets the target latency of the application. Generally, the lower the target latency, the nearer the processing for the application 110 will be to the computing device 108. (See FIG. 6 for more details)

At 510, the selected computed resource location within the network is utilized to perform processing for the application 110. As discussed above, the latency aware routing controller 130 provides instructions 308 to the selected location(s) to cause the computing resources 124 associated with the selected location(s) to perform the application processing 124.

FIG. 6 is a flow diagram of an example process 600 that includes identifying a location in a network to perform processing for an application according to some implementations. The process 600 may be performed by one or more computing devices, such as the computing devices described with regard to FIGS. 1-4.

At 602, possible computing resource locations to perform processing for the application are identified. As discussed above, many different locations within the network 102, and/or external from the network, can include computing resources 120 for performing application processing 124.

For example, a mobile network service provider may position computing resources throughout the network 102 and utilize available computing resources 120 outside of the network (e.g., Internet 112) to perform application processing 124. For instance, the locations can include but are not limited to computing resources 120 located at/near base stations, gateways, core network, and the like.

At 604, a computing resource location is selected from the identified computing resource locations. As discussed above, the latency aware routing controller 130 selects one of the identifies locations such that a determination can be made as to whether the selected location satisfies the target latency associated with the application 110. According to some configurations, the latency aware routing controller 130 first selects the location farthest from the edge of the network (e.g., the location having the largest latency), and then the next location closer to the edge is selected. In other examples, the ordering of the selection can be changed (e.g., random, closest location to farthest location from the edge, ... ).

At 606, a determination is made as to whether the selected computing resource location satisfies the target latency associated with the application 110. When the selected location satisfies the target latency, the process moves to 608. When the selected location does not satisfy the target latency, the process returns to 604 where another location is selected.

At 608, the computing resource location is identified as satisfies the target latency associated with the application 110. As discussed above, one or more locations may satisfy the target latency associated with the application 110. In some configurations, the process returns to 604 if there are additional locations that have not been checked to determine as to whether or not the location satisfies the target latency for the application 110. In other examples, the process moves to 610 when one or more of the locations satisfying the target latency are selected to perform the application processing for application 110.

At 610, one or more locations are selected to perform application processing 124 for the application 110. As discussed above, one or more locations inside or outside of the network 102 can be selected to perform the application processing. In some configurations, the location farthest from the edge of the network (e.g., having the largest latency) that satisfies the target latency is selected. In other examples, the location aware routing controller 130 can select a location nearer the edge based on anticipated traffic within the network. For example, the location aware routing controller 130 identifies that the network is becoming more congested and selects a location nearer to the computing device 108. In yet other configurations, the application processing 124 can be divided between different locations The various techniques described above are assumed in the given examples to be implemented in the general context of computer-executable instructions or software, such as program components, that are stored in computer-readable storage and executed by the processor(s) of one or more computers or other devices such as those illustrated in the figures. Generally, program components include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on particular circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method performed by one or more processors configured with specific instructions, the computer-implemented method comprising:
   determining a target latency for an application, the target latency being specified by the application;
   receiving, at a network affiliated with a wireless service provider, data from a computing device associated with the application;
   receiving first latency data from a base station, second latency data from an intermediate gateway, and third latency data from a service node located within a core network of the network;
   selecting, from a plurality of locations associated with the network, a location of computing resources to perform processing for the application based, at least in part, on the target latency, the first latency data, the second latency data, and the third latency data; and
   causing the processing for the application to be performed using the computing resources located at the location.

2. The computer-implemented method of claim 1, wherein receiving the first latency data, the second latency data, and the third latency data comprises receiving data from one or more of network probes, internal network Key Performance Indicator (KPI) measurements, or monitoring systems positioned at different locations within the network.

3. The computer-implemented method of claim 1, wherein determining the target latency for the application comprises determining a value of the target latency based, at least in part, on a type of the application.

4. The computer-implemented method of claim 1, wherein selecting the location of computing resources to perform processing for the application comprises determining that a latency associated with the location is less than the target latency.

5. The computer-implemented method of claim 4, wherein the plurality of locations includes an eNodeB.

6. The computer-implemented method of claim 1, further comprising:
   selecting, from the plurality of locations associated with the network, a second location of computing resources to perform processing for the application based, at least in part on, the target latency and updated latency data; and
   causing the processing for the application to be performed using the computing resources located at the second location.

7. The computer-implemented method of claim 1, wherein selecting, from the plurality of locations associated with the network, the location of computing resources to perform processing for the application comprises determining that a first location within the network has a first latency that is greater than the target latency and that the location within the network has a latency that is less than or equal to the target latency.

8. The computer-implemented method of claim 1, wherein receiving the first latency data, the second latency data, and the third latency data comprises receiving data from a first probe associated with the base station, a second probe associated with the intermediate gateway, and a third probe associated with the service node.

9. The computer-implemented method of claim 1, wherein the base station comprises an eNodeB base station and the intermediate gateway comprises at least one of a radio access network (RAN) gateway, a serving gateway (SGW), or a packet data network (PGW).

10. The computer-implemented method of claim 1, further comprising receiving fourth latency data associated with an internet resource.

11. The computer-implemented method of claim 10, wherein the fourth latency data is received via a probe associated with the internet resource.

12. A non-transitory computer-readable media storing computer-executable instructions that, when executed, cause one or more processors of a computing device to perform acts comprising:
   determining a target latency for an application based, the target latency being specified by the application;
   receiving, at a network affiliated with a wireless service provider, data from a computing device associated with the application;
   receiving first latency data from a base station, second latency data from an intermediate gateway, and third latency data from a service node located within a core network of the network;
   selecting, from locations associated with the network, a location of computing resources within one or more of the network or a second network, to perform processing for the application based, at least in part, on the target latency and, the first latency data, the second latency data, and the third latency data; and
   causing the processing for the application to be performed using the computing resources at the location.

13. The non-transitory computer-readable media of claim 12, wherein receiving, the first latency data, the second latency data, and the third latency data comprises receiving data from one or more of network probes or monitoring systems.

14. The non-transitory computer-readable media of claim 12, wherein selecting the location of computing resources within the network to perform processing for the application comprises determining that a latency associated with the location is less than the target latency.

15. The non-transitory computer-readable media of claim 12, the acts further comprising:
   selecting, from the locations within the network, a second location of computing resources within the network to perform processing for the application based, at least in part, on the target latency and updated latency data; and
   causing the processing for the application to be performed using the computing resources at the second location.

16. The non-transitory computer-readable media of claim 15, wherein selecting, from the locations within the network, the location of computing resources within the network to perform processing for the application comprises determining that a first location within the network has a first latency that is greater than the target latency and that the location within the network has a latency that is less than or equal to the target latency.

17. A system comprising:
   one or more processors; and
   one or more memories storing instructions that, when executed by the one or more processors, perform acts including:
      determining a target latency for an application, the target latency being specified by the application;
      receiving, at a network affiliated with a wireless service provider, data from a computing device associated with the application;
      accessing latency data identifying latencies for different locations within the network;
      selecting, from locations within the network, a location of computing resources to perform processing for the application based, at least in part, on the target latency and the latency data;
      causing the processing for the application to be performed using the computing resources at the location;
   a first network probe at a first location within the network, the first location being associated with a base station; and
   a second network probe at a second location within the network, the second location being associated with one or more of an intermediate gateway or a service node located within a core network,
   wherein receiving the latency data comprises receiving data from the first network probe and the second network probe.

18. The system of claim 17, wherein selecting the location of computing resources comprises determining that a latency associated with the location is less than the target latency.

19. The system of claim 17, the acts further comprising:
   selecting, from the locations within the network, a second location of computing resources to perform processing for the application based, at least in part, on the target latency and updated latency data; and
   causing the processing for the application to be performed using the computing resources at the second location.

20. The system of claim 17, wherein selecting, from the locations within the network, the location of computing resources to perform processing for the application comprises determining that a first location within the network has a first latency that is greater than the target latency and that the location has a latency that is less than or equal to the target latency.

* * * * *